United States Patent [19]
Pickett

[11] 3,733,948

[45] May 22, 1973

[54] SELF ALIGNING BASE CLAMP AND HOLDER FOR DISPOSABLE BLADE AND WATER BATH FOR MICROTOMES AND METHOD

[76] Inventor: John E. P. Pickett, 3323 Pinafore Drive, Durham, N.C. 27705

[22] Filed: June 16, 1971

[21] Appl. No.: 153,781

[52] U.S. Cl. ............... 83/98, 83/915.5, 134/191, 83/412, 83/698, 83/662, 83/655
[51] Int. Cl. ............................................. B26d 4/00
[58] Field of Search .................... 83/98, 412, 631, 83/698, 915.5, 662, 655; 134/191

[56] References Cited

UNITED STATES PATENTS

| | | | |
|---|---|---|---|
| 3,599,523 | 8/1971 | Pickett | 83/698 X |
| 3,552,247 | 1/1971 | Pickett | 83/78 X |
| 2,643,579 | 6/1953 | Jacoby, Jr. | 83/915.5 X |
| 2,232,008 | 2/1941 | MacDonald | 83/915.5 X |
| 2,212,953 | 8/1940 | Popp et al. | 83/915.5 X |

Primary Examiner—Andrew R. Juhasz
Assistant Examiner—W. Donald Bray
Attorney—B. B. Olive

[57] ABSTRACT

A thin, flexible and disposable blade for microtome cutting has a microtome quality cutting edge and is held by an improved base clamp and blade holder structure which is adapted to flex, clamp and tension the disposable blade without vertical or tilt adjustment. A water trough may be secured to the blade holder to receive and float cut specimens directly from the blade. A method to perform corresponding steps is also disclosed.

3 Claims, 30 Drawing Figures

INVENTOR.
John E. P. Pickett

BY

B. B. Olive

ATTORNEY

*INVENTOR.*
John E. P. Pickett

BY

*B. B. Olive*

ATTORNEY

INVENTOR.
John E. P. Pickett
BY
B. B. Olive
ATTORNEY 3,733,948

SELF ALIGNING BASE CLAMP AND HOLDER FOR DISPOSABLE BLADE AND WATER BATH FOR MICROTOMES AND METHOD

CROSS-REFERENCE TO RELATED APPLICATION

This application is related to and constitutes an improvement upon copending application Ser. No. 885,143, filed Dec. 15, 1969, entitled "Disposable Blade And Holder For Microtome", now U.S. Pat. No. 3,599,523, and copending application Ser. No. 126,674 filed Mar. 22, 1971, entitled "Method Utilizing A Disposable Blade In Microtome Cutting".

BACKGROUND OF THE INVENTION

1. Field of the Invention

The invention relates to microtome knives or blades and knife or blade holders, particularly to disposable blade and disposable blade holder constructions and to methods of employing disposable blades.

2. Description of the Prior Art

It has long been the practice in the art for microtome knives to take the form of being relatively thick, inflexible, and adapted to being resharpened. Such knives are made of a very fine grade of steel and are adapted to receive an extremely sharp and relatively smooth cutting edge when sharpened. Such knives as seen in profile are biconcave, plano-concave, wedge shaped or tool edge shape sharpened. However, the conventional knives are expensive in initial cost and require expensive and time consuming resharpening equipment as well as extra technician time for resharpening. Over the years there have been many attempts to provide a microtome blade holder adapted to receive some type of disposable blade such as "wafer" type double edge blades or typical single edge safety razor blades. Some of the prior patent blade holders and disposable wafer and single edge safety razor blades have found limited application in teaching laboratories where the cutting requirements are not critical and where relatively soft tissue is being cut. In addition to the conventional thin, disposable, "wafer" type double edge and single edge safety razor blades sold under such trademarks as Gillette, Wilkinson, Star, Personna and Gem another type of disposable blade used in surgical practice is the single edge, disposable surgical blade sold under various trademarks, e.g., Personna and Weck. Blades of this type are widely used for surgical preparation, autopsies and general tissue cutting. The surgical Personna or Weck type blade like the Gem and Star single edge blade is normally provided on the unsharpened edge with a bent metal cover or banding member which gives rigidity to the blade and allows the user to safely hold the blade for cutting. The surgical blade differs from the conventional double edge, "wafer" blade in that it is generally thicker, longer, and more elongated and rectangular in shape than most conventional single edge and double edge disposable wafer blades. When the mentioned cover member is removed from the surgical blade as taught by the copending application Ser. No. 885,143 now U.S. Pat. No. 3,599,523 it has been found that while not as flexible as the usual wafer blade the surgical blades can nevertheless be flexed with a properly applied force. Of particular importance, the surgical blade inherently lends itself to being made with an extremely sharp and relatively smooth edge of microtome knife quality whereas ordinary conventional single and double edge disposable blades even though suited to ordinary shaving do not in fact have either relatively smooth or sharp edges. While both conventional, disposable, single edge and double edge "wafer" type blades have been used in microtome blade holders for disposable blades, the art was given for the first time with the invention taught by the mentioned copending application Ser. No. 885,143, a cutting system built around the employment of the surgical type blade, e.g. those made by Personna or Weck, modified by removal of the mentioned cover member.

Another aspect of cutting with both the conventional microtome knife as well as with such types of disposable blades as have been shown in prior art is that a change of blade almost always requires repositioning of the knife or blade holder before cutting is recommenced. If a blade or knife is nicked or damaged at the time of locating say a very thin and malignant tumor or lesion then if the blade is moved for replacement the chances are high that the tumor or lesion will be missed. This is so since the knife or blade after being unclamped and being replaced may cause up to five succeeding sections to be missed in the course of getting the cutting thickness readjusted. Of equal significance is that many times when very thin sections, e.g. 1 to 2 microns, are being cut the operator may have to try a number of supposedly sharp knives to find an acceptable cutting edge. The problem of knife damage and required resharpening, if not complete discard of the damaged knife, also arises whenever a hard cotton or nylon suture, surgical clip, gun pellet, calcium deposit or like foreign matter is embedded in the tissue being cut and strikes the knife edge.

In another aspect of the prior art, the prior art disposable wafer blade holders require loading of new wafers from the front of the holder. Since the front of the holder is in the immediate cutting area where the tissue ribbons collect each blade change inherently requires disturbing this critical operational area and introduces the possibility of foreign matter, e.g. paraffin, getting into the blade holder interior. Furthermore, such front loading holder blade change mechanisms are generally awkward and slow to operate and do not adapt to the requirements for holding blades being used to cut frozen tissue, e.g. a Cryostat microtome. With the foregoing shortcomings of the prior art in mind it may be accurately and objectively stated that the blade holder of the mentioned copending application Ser. No. 885,143 now U.S. Pat. No. 3,599,523 provides a microtome blade holder for holding a disposable blade having a cutting edge of microtome knife quality, which can cut any type tissue, bone, etc., cut by a microtome knife, which allows side loading replacement and which adapts to frozen and unfrozen tissue cutting.

While the invention of the mentioned copending application Ser. No. 884,143 now U.S. Pat No. 3,599,523 represented a substantial advancement in the art of microtome cutting, it has also served to point up other needed improvements dealt with by the present invention.

Of particular interest to the present invention it may be noted that both with respect to conventional wedge shaped microtome blade holders as well as blade holders made according to the copending application Ser. No. 885,143 now U.S. Pat. No. 3,599,523 that when the blade holder is first installed in the microtome it is necessary to make very fine adjustments laterally, longitudinally, rotatively or in tilt and vertically. Also, whenever any of these adjustments are accidently disturbed they must be rechecked and readjusted. Even though these adjustments have been a part of conventional microtome blade holder practice for many years, it has been observed that for most microtome cutting with the present invention the blade holder can be arbitrarily fixed in tilt or rotatively, and vertically in fixed positions which never change. Practically speaking, many of the adjustments have been found not to be actually necessary and a blade holder can be machined, as recognized by the present invention, so that the blade is caused to assume a certain vertical and tilt orientation with respect to the face of the tissue block which orientation never changes between blade replacement. However, neither the blade holder of the copending application nor any blade holder in the prior art has eliminated the various adjustments in question nor did copending method application Ser. No. 126,674 filed Mar. 22, 1971 eliminate such method steps in the manner of this invention.

In another aspect of the prior art of particular interest to the present invention it may be noted that when tissue specimens are cut by the microtome blade it is common practice to transfer the cut issue specimen from the face of the microtome blade and holder to a water bath where the tissue is ultimately floated onto a slide or film strip according to the tissue mounting technique which is employed following the cutting operation. In prior U.S. Pat. No. 3,552,247 there is taught an apparatus which adapts to conventional non-disposable wedge type microtome blades and provides an associated water trough. In this respect, it may be noted that neither the invention of the copending application Ser. No. 885,143 nor any of the blade holders of the prior art make provisions for a blade holder adapted to using a surgical type, single edge, disposable blade having a microtome knife quality edge which requires no vertical or tilt adjustments and in conjunction therewith providing a water bath mounted directly on the blade holder so that the tissue specimens may slide from the knife and float directly on water after being cut and then directed on a slide or onto film.

In one final aspect of the prior art, it is noted that there has not been provided a single clamp structure which performs both the function of a "knife clamp" and a "blade holder" and which is specifically adapted to receive the described Weck type unbanded, rectangular disposable blade of microtome quality and which receives the blade in an orientation that avoids either tilt or vertical adjustment. Prior art methods of mounting and cutting with disposable blades have been lacking in the same respect.

SUMMARY OF THE INVENTION

According to the invention there is provided a precision machined microtome blade clamp and holder structure adapted to releasably receive the surgical type, single edge, disposable blade having a microtome knife quality edge for use in cutting all of the various type of thick, thin, soft, hard and dense tissue and bone specimens encountered in medical laboratory practice. In one embodiment, the blade holder is adapted to be received by a modified precision microtome blade clamp in which tilt and vertical positioning devices have been eliminated. The blade holder automatically assumes a position such that when the blade holder is clamped in cutting position, the surgical type blade is slightly tensioned and curved and such blade curvature adds to a predetermined angle tilt of the blade holder to facilitate a proper angle of cut and clearance of the tissue block when moving past the blade. That is, the base clamp and blade holder of the invention work with minimum prepositioning procedures. A cam mechanism, similar to that shown in copending application Ser. No. 885,143 now U.S. Pat. No. 3,599,523, moves between a blade clamping and blade release position and in the release position a replacement blade can be slid in from either side of the holder and used to eject the worn blade being replaced without disturbing the blade holder which remains clamped in position. In a further embodiment, the functions of the knife clamp and blade holder of the copending application Ser. No. 885,143 now U.S. Pat. No. 3,599,523 have been combined into a unitary blade clamp which eliminates the need for a separate blade holder as such and eliminates tilt and vertical positioning operations. In other embodiments, the blade holder is provided with a water bath which in one form adapts to slides and in another to film. A common blade positioning method is used all embodiments.

In comparison with the blade holder of the copending application Ser. No. 885,143 now U.S. Pat. No. 3,599,523, minimal prepositioning method operations are required. Methodwise, it is no longer necessary to initially adjust the blade holder vertically or in tilt and this applies to all embodiments. When blades are first installed or replaced the operator can immediately start or resume sectioning without having to adjust vertically or in tilt and thus without fear of losing some critical and thin section in the course of starting or restarting the cutting schedule. A fixed and appropriate angle of cutting is immediately established as soon as the blade is installed and clamped and this angle will not change. It should be noted that in comparison each installation and each change of a conventional knife requires vertical and tilt angle adjustment since sharpening wears away at the knife edge. Such adjustments have also been required in my prior copending applications related to disposable blades and methods. In the typical water bath operation it can also be seen that transfer to a water bath is eliminated by some of the invention embodiments. As an adjunct to all embodiments, provision is also made for introduction of air to cool the blade during cutting thus eliminating use of ice blocks and the like.

DETAILED DESCRIPTION

Figures 1, 3:
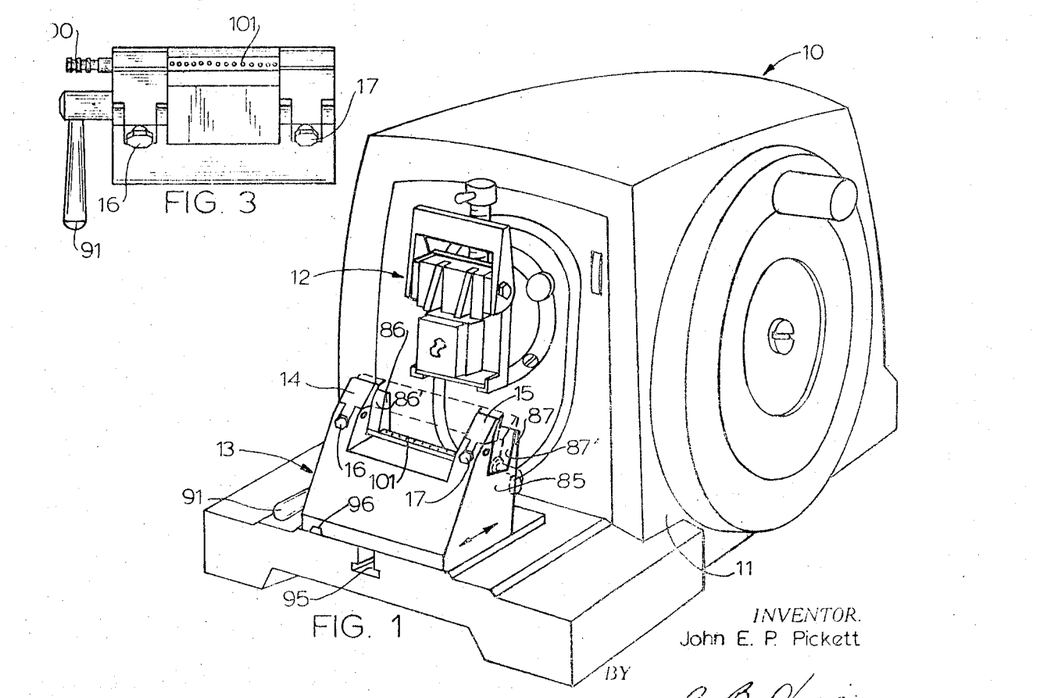
FIG. 1 is a pictorial view of a conventional microtome with a first embodiment of the base clamp of this invention mounted on the microtome and in dashed lines the associated disposable blade holder.
FIG. 3 is a top plan view of the first embodiment clamp.

Referring to FIG. 1, a conventional rotary microtome 10 comprises a housing 11 having the customary gearing for moving the specimen holder 12 in a vertical reciprocatory path and at the same time feeding holder 12 outwardly against a stationary knife. The American Optical Company, Spencer 820 microtome is used in illustration. The first embodiment base clamp of the invention is generally indicated at 13. Base clamp 13 is adjustable only longitudinally as indicated by the arrow in FIG. 1. That is, base clamp 13 unlike the prior art has eliminated both vertical and tilt or rotating positioning mechanisms found in conventional Johns Hopkins and similar conventional microtome knife clamps. As more fully explained later, once base clamp 13 is adjusted longitudinally and the replaceable blade of the invention installed in its holder, the blade is automatically adjusted for the proper clearance angle, tilt and position. Base clamp 13 has a pair of jaws 14, 15 against which the end portions of the disposable blade holder, later discussed, are securely held in the clamp by adjusting screws 16, 17. That is, the space normally occupied by the conventional microtome knife is instead occupied by the disposable blade holder, the disposable blade thickness being at most a minor portion of the conventional tapered knife thickness.

The blade holder in the preferred form is generally designated 18 and is comprised of five parts, two of which are movable. Here it should be understood that the replaceable blade holder and replaceable blade being discussed and shown in FIGS. 9, 10, 11 and 12 are such as disclosed in copending application Ser. No. 885,143 now U.S. Pat. No. 3,599,523, are not, per se, part of the present invention but which are useful with the base clamp of the present invention. Support for the disposable blade is provided by a backing plate 20 which resides in clamp 13 and has ends which extend outside the respective jaws 14, 15. Backing plate 20 has beginning at its uppermost edge 20a, a concave sloping surface 21 which in use receives the disposable blade 80 and which extends downward a predetermined distance corresponding to the width of disposable blade 80, and across the complete width of plate 20. At the base of concave surface 21 is a shallow ledge 22 which acts as a stop or rest and supports the disposable blade 80. A flat face 23 extends downward from ledge 22. Face 23 has threaded holes 24, 25, 26, 27, 28, 29, 30 and 31 which extend into plate 20 a predetermined distance. Near the bottom edge of plate 20 there is a semicircular groove 32 which extends into and across plate 20. Immediately adjacent the bottom of plate 20 and extending upwardly to the bottom edge of groove 32 is a small flat face area 33. The back of plate 20 is formed flat which provides a flat back clamping surface for clamping the blade holder of the invention in the jaws 14, 15 of the base clamp 13 of the invention.

Figure 10:
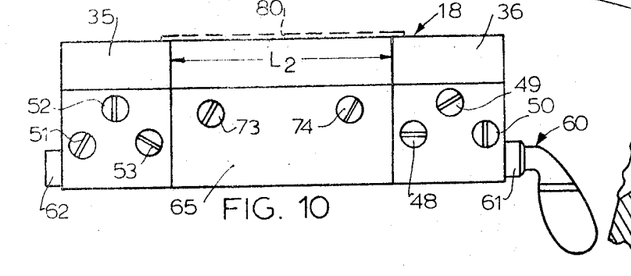
FIG. 10 is a plan view of the assembled blade holder of FIG. 9 and showing in dashed lines the position of the disposable blade held by the holder.
Figure 11:
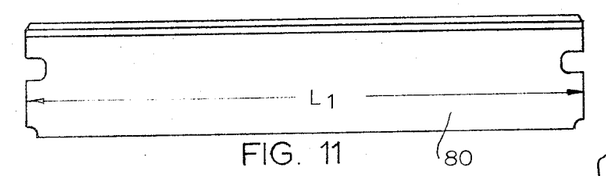
FIG. 11 is a plan view of a disposable blade used in this invention.

Opening and closing of the blade holder is controlled by a rotatable cam shaft member 60 whose ends terminate in a pair of stops 61, 62 formed integral therewith and which act to prevent axial movement of shaft 60 in groove 32 of backing plate 20. When the blade holder of the invention is assembled, stops 61, 62 reside on the ends of back plate 20 as best shown in FIG. 10. Shaft 60 has an integral extension which extends outward and downward from stop 61 and provides a finger grip or manual control member 63 for the operator to use in rotating cam shaft 60. Shaft 60 also has a flat side 64 cut therein which provides a flat side whose function will be described later.

A pair of identical clamping plates 35, 36 are adapted to be fixedly mounted on plate 20. Since plates 35 and 36 are identical, only plate 35 will be described in detail and it will be seen that plates 20, 35 and 36 form an essentially integral structure. Clamping plate 35 has a flat inner face 37 which matches flat face 23 of plate 20. Also, a semicircular groove 38 mates with groove 32 of plate 20 and together form a circular opening. Upward a predetermined distance from groove 38 is an inward angled flat surface 40. Surface 40 extends upward a predetermined distance so that uppermost edge 41 is in alignment with edge 20a of backing plate 20.

At this point, edge 41 extends outward forming a flat ledge 42. Ledge 42 then extends downward at a predetermined angle a predetermined distance to form a slope clamping face 43 which joins a flat front face 44. Face 44 has three threaded holes therein 45, 46, 47 mating respectively with threaded holes 24, 25, 26 in plate 20. Holes 45, 46, 47 are recessed so that the screw heads of screws 48, 49, 50 will remain flush with face 44. Once screws 48, 49, 50 are tightened, clamping plate 35 is held firmly in place against backing plate 20. As previously stated, clamping plate 36 is identical to clamping plate 35 and is held firmly in place by screws 51, 52, 53 mating with holes 29, 30, 31 respectively. Clamping plates 35, 36 thus hold cam shaft 60 in place but with freedom to rotate. While shown as three separate parts plates 20, 35 and 36 may be made as an integral unit with a base clamp as later discussed with reference to FIG. 25 and cam shaft 60 mounted accordingly.

A central pivotal plate 65 fits within the lateral spacing of clamping plates 35 and 36 and as later explained provides means for clamping blade 80. Plate 65 has a convex sloping surface 66 which mates with concave surface 21 of backing plat 20 and it is between these surfaces that blade 80 is clamped. The base of con-vex surface 66 joins a flat surface 67 which extends downward from surface 66 and in use mates with the opposing portion of surface 23 of plate 20. A square shaped slot 68 is cut into surface 67 adjacent the bottom edge. Square slot 68 aligns with semicircular grooves 32 and 38 to form an opening for the full length of the holder and in which resides shaft 60. Slot 68, unlike grooves 32 and 38, has straight sidewalls with no curvature and is designed so that flat side 64 of shaft 60 when the holder is open as in FIG. 13 aligns with and rests against surface 68' of slot 68. A flat surface 69 on plate 65 mates with flat surface 33 of backing plate 20. A flat exterior surface 70 generally aligns with faces 44 of clamping plates 35, 36. A pair of unthreaded holes 71, 72 are formed in pivotal plate 65 which is pivotally secured to backing plate 20 by screws 73, 74 which pass through holes 71, 72 of somewhat larger diameter, and are screwed into holes 27, 28. A front tapered smoothly polished, angle surface 75 extends from surface 70 to the end of convex slope 66 and it is this surface which acts as a continuation of the blade edge and guides the cut tissue.

As previously stated, disposable blade 80 is taught by the prior copending application Ser. No. 885,143 but is suitable for use with this invention but without the usual guard member. With the guard member such blades are manufactured and sold under various trademarks such as Personna and Weck. The desired character is illustrated by a description of blade 80. Blade 80 is of a length L-1 greater than the length L-2 of pivotal plate 65 and is substantially greater in length than standard single or double edge razor blades so that cuts can be taken from large specimen blocks. That is, a specimen block up to at least L-2 length can be cut. In one embodiment, blade 80 is a Weck blade 2 ¼ by ½ inch approximately, and of 0.010 inch thickness which allows the blade to be slid into the blade holder from the side and so that it resides between concave slope 21 and convex slope 66 and rests on ledge 22 of backing plate 20. Blade 80 preferably has a compound angled edge of microtome knife edge cutting quality but unlike single edge razor blades now on the market, blade 80 has no guard or banding member on the non-cutting edge. That is, the conventional "Weck" or "Personna" single edge surgical blade is modified by having the guard member removed. Removal of the guard member substantially enhances blade flexibility. Stainless steel is a preferred material for use in making blade 80. Chrome-carbon blades are acceptable where shorter storage periods exist and corrosion is no problem.

In FIGS. 1–8 which illustrate the first embodiment, blade clamp 13 can be seen to have a base block 85 which mounts jaws 14, 15 with screws 16, 17 opposite opposed back flanges 86, 87. Flanges 86, 87 provide precision backing surface 86', 87' which receive the plate 20 of the blade holder 18. Of particular interest to the present invention is the fact that plate 20, the angle X of backing surfaces 86', 87', blade backing surface 21 and blade bending surface 66 are all designed and coordinated in respective angles and curvature so that the blade clearance angle Y is about 30° and the blade edge at the proper height when the blade 80 is properly locking in position. Conventional vertical adjusting screws are eliminated and the outer cutting edge of blade 80 always positions itself at a fixed, uniform and repeatable vertical level and at the right tilt. This means that the blade which itself is uniform and precise always assumes a cutting position which is uniform in cutting angle and vertical position from blade to blade. Whereas conventional microtome cutting with the nondisposable wedge type blade requires an adjustment for blade "tilt" or blade cutting angle as well as the blade vertical position each time a blade is installed, replaced or cuts tissue, bone or other material of different hardness, this step is eliminated by the present invention. That is, it has been somewhat surprisingly discovered that if a disposable blade and disposable blade holder of the kind taught by the prior copending application Ser. No. 885,143 are employed with a blade clamp such as clamp 13 in which the blade is always of uniform surgical precision quality and the blade holder clamp, like clamp 13 designed to always restore the cutting angle Y to about 30° that tilt and vertical positioning can be eliminated for most if not all tissue and bone cutting procedures. Furthermore, the normal vertical adjusting screws for raising and lowering the blade edge vertically can also be eliminated. Stated differently, base clamp 13 when employed with blade holder 18 and replaceable blade 80 can be used for cutting essentially all type of histology specimens and without any requirement to change the blade tilt, vertical position, or cutting angle between blade changes or changes in type of specimen being cut. Since blade 80 can always be released and shifted laterally, horizontal positioning of holder 18 is always unnecessary. Of course, longitudinal, i.e. forward and backward positioning is required as indicated by the arrow in FIG. 1. This positioning step has however been simplified by employment of a locking stud 90 and a camming lever 91 having a suitable camming connection 92 (FIG. 8) such that rotation of lever 91 locks and unlocks stud 90 in slot 95 (FIG. 1). A fixed lateral sliding position of base clamp 13 is provided by the precision formed mating spline and groove indicated at 96 in FIG. 1. From this explanation it will be understood that after blade holder 18 is installed in base clamp 13, base clamp 13 is moved back and forth and then locked in an appropriate longitudinal position by lever 91.

It will be noted, as shown in FIGS. 1 and 3, that an inlet pipe 100 communicates with holes 101 and allows a suitable cooling gas, e.g. air, to be directed out of holes 101 against holder 18 and blade 80. While it is well-known that blade cooling facilitates cutting, such cooling has not heretofore been available in a replaceable blade base clamp such as base clamp 13.

Figure 13:
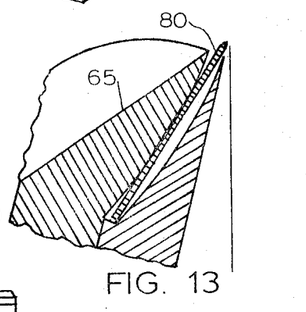
FIG. 13 is an enlarged, fragmentary, section view of the disposable blade receiving portion of the unlocked holder of FIG. 10 but shown in a normal tilt, off vertical.
Figure 14:
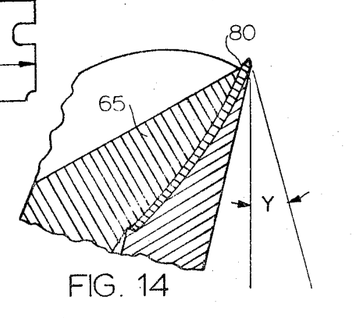
FIG. 14 is an enlarged, fragmentary, section view of the disposable blade receiving portion of the locked holder of FIG. 10, but which is also shown in a normal tilt, off vertical.

Reference will now be directed to the details of a typical operation of base clamp 13 representing the first embodiment of this invention. Once the blade holder 18 is assembled as described and illustrated in FIG. 10, microtome base clamp 13 is mounted on microtome 10 as in FIG. 1 utilizing lever 91 and stud 90. The disposable blade holder 18 is slid into the base clamp 13 endwise so that clamping plates 35, 36 are in central alignment with jaws 14, 15. Once in position, jaws 14, 15, by use of screws 16, 17, are tightened on sloped surfaces 43 of clamp plates 35, 36 and effectively lock the blade holder in clamp 13. Finger grip or control member 63 is turned so that flat side 64 of shaft 60 is in alignment with surface 68' of slot 68 of pivotal plate 65. With shaft 60 in this "unlocking" position, blade 80 is slid into the holder from the side so that it rests on ledge 22 between concave sloping surface 21 and convex sloping surface 66. Note here that plates 35, 36 and 20 form fixed blade shaped slots $S_1$, $S_2$ (FIG. 23) through which blade 80 can be slid from the side in a snug, slidable fit. Two slots $S_1$, $S_2$ insure the ability to push out the old blade with the new blade. With only one slot $S_1$ the old blade can be lifted vertically, however the presence of two slots $S_1$, $S_2$ is much preferred. Once the blade 80 is in position, shaft 60 is rotated by turning finger grip 63 towards the operator. As shaft 60 is rotated, flat side 64 is rotated away from slot 68 and the circular portion of shaft 60 is brought into contact with surface 68' of slot 68 which causes central pivotal plate 65 to be pivoted slightly. FIGS. 13 and 14 more clearly illustrate what takes place. FIG. 13 illustrates the open position or position in which shaft 60 has not yet been rotated but blade 80 has been placed in the holder in a snug fit. FIG. 14 shows plate 65 pivoted forward slightly about the edge of ledge 22 by the camming effect of shaft 60 with slot 68. Convex surface 66 is moved forward against substantially the whole plane of blade 80 so that blade 80 is bent uniformly around a longitudinal axis until it is against concave surface 21. At this point, shaft 60 assumes a "locked" position holding blade 80 curved and with the edge of blade 80 stiffened and angled for proper cutting. This curving of blade 80 along with the tilting of clamp 13 provides a preferred total clearance angle Y of approximately 30° for blade 80's leading edge surface. Of special significance to the present invention is the fact that blade clamp 13 receives and positions blade holder 18 so that operation of lever 60 automatically causes the blade edge to assume a proper cutting angle with the usual tilt or vertical adjusting of blade holder 18 being eliminated.

Blade 80 once dulled can be replaced by reversing finger grip 63 so as to turn cam member 60 back to the position of FIG. 13 which releases the blade. In this released position blade 80 can also be moved laterally which eliminates the need to shift blade holder 18 laterally. Blade 80, once released, is then pushed endwise out of the holder as a new blade is being pushed in. Of significant importance is the fact that blades are always initially at a fixed proper cutting angle Y and can be changed without removing or adjusting the blade holder 18 from base clamp 13. This in turn eliminates loss of valuable sections due to retrimming of the section block as is necessary to disposable blade holders now in use. Also, blades 80 can be replaced from either side of the holder as preferred by the individual operator. Replacement blades are easily installed by simply turning cam shaft 60 into an "unlocking" position and inserting a new blade from either side usually determined by the operator being left or right handed. At no time is the operator exposed to sharp edges, which could nick or cut, while inserting a new blade. Blade thickness and curvature insure "locking" of shaft 60. That is, shaft 60 inherently tends to stay locked when in a lock position. No readjustment of blade angle is ever required for tilt or elevation.

The invention in the just described first embodiment thus not only eliminates conventional knives as in the invention of the copending application Ser. No. 885,143 but more specifically in this invention completely eliminates the need for vertical and tilt positioning operations. Repositioning of the knife clamp upon changing blades has been eliminated. The invention knife clamp 13, as in copending application Ser. No. 885,143, has furthermore overcome the problem of "chattering" or edge vibration experienced in prior art holders designed for wafer type disposable blades. Cutting at least equal to and in many applications superior to microtome knife edge cutting quality is obtained. Even though the blade of the invention, as originally taught by copending application Ser. No. 885,143, is normally difficult to flex, e.g. simply By holding and pressing between the fingers it is made to flex sufficiently for the invention by applying the force of the concave surface 66 over substantially the whole blade surface. The amount of curvature, preferably on about 1¼ inch radius, is variable by adjusting screws 73, 74. Unlike prior art disposable blades and holder, e.g. U.S. Pat. No. 1,865,539, blade 80 is not required to be tensioned longitudinally. Since the knife clamp 13, blade holder 18 and blade 80 of the invention can be and necessarily are precision made each new blade acts precisely as the blade before and irrespective of the nature of the specimen and always cuts at the same angle. Such precision cutting therefore conforms to the precision of the microtome itself and accomplishment not heretofore achieved. Blade thickness, curvature and positioning always insures obtaining the same precise "locked" position of the parts. Blade tilting and elevating are, however, eliminated.

Figure 15:
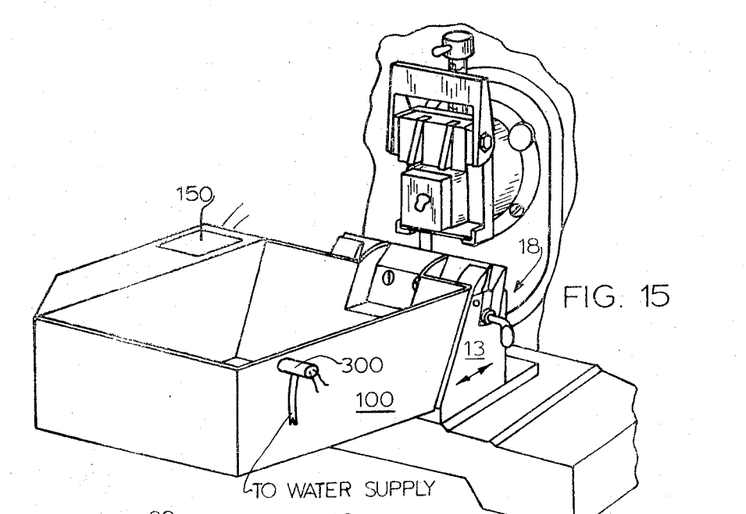
FIG. 15 is a pictoral view of a conventional microtome with a second embodiment of the base clamp and associated disposable blade holder of the invention mounted on a microtome.
Figure 16:
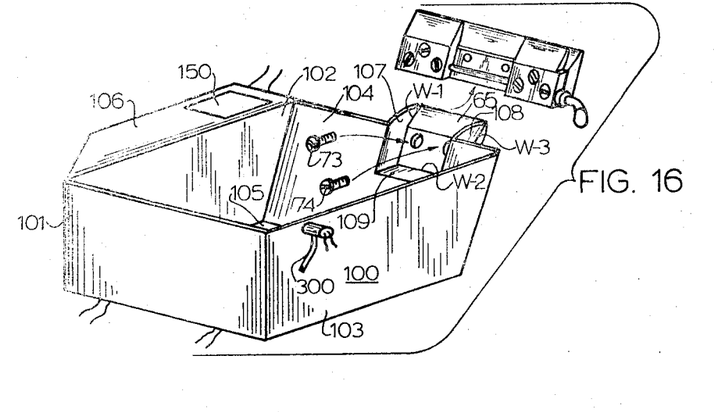
FIG. 16 is an exploded perspective view of the second embodiment blade holder of the invention.
Figure 17:
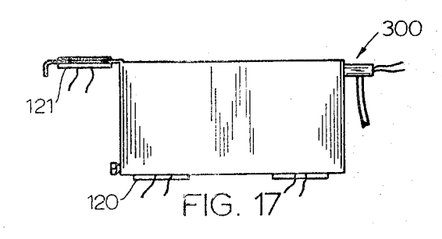
FIG. 17 is a front elevation view of the second embodiment.
Figure 18:
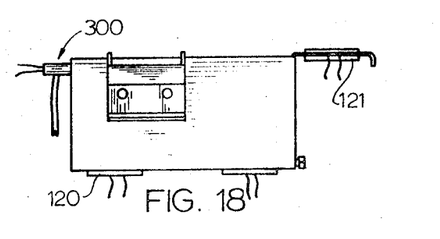
FIG. 18 is a rear elevation view of the second embodiment.
Figure 19:
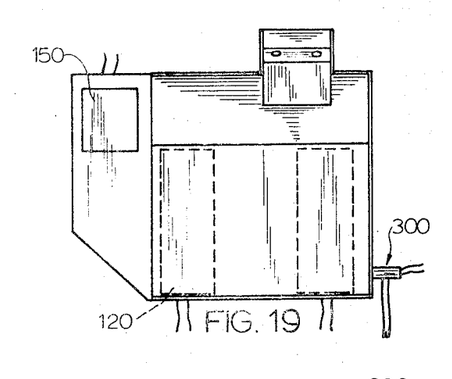
FIG. 19 is a top view of the second embodiment.
Figure 20:
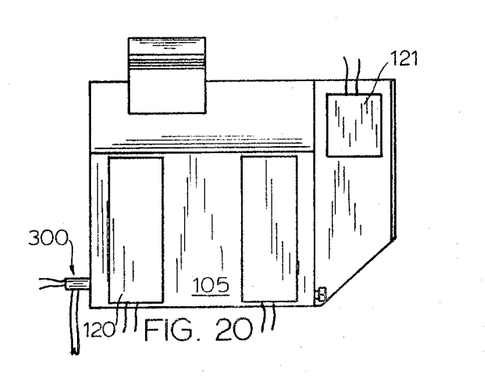
FIG. 20 is a bottom view of the second embodiment.
Figure 21:
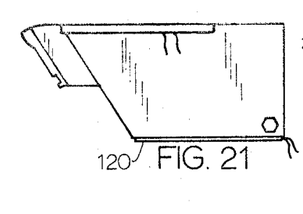
FIG. 21 is a left elevation view of the second embodiment.
Figure 22:
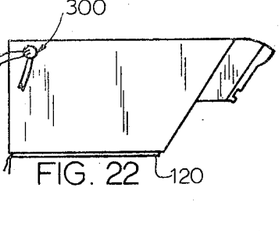
FIG. 22 is a right elevation view of the second embodiment.

Reference is next made to FIGS. 15 through 22 illustrating a second embodiment blade clamp of the invention. Basically, the second and first embodiments are alike in that the previously described base clamp 13 is employed in the second embodiment with the previously described disposable blade holder 18. In the manner of the first embodiment all tilt and vertical positioning of the blade is avoided. That is, base clamp 13 and blade holder 18 shown in FIG. 15 are used in the same manner as previously described. It will be seen however that in the second embodiment a water trough 100 is secured to block 65. As best seen in FIG. 16, trough 100 has an open top and includes main side walls 101, 102, 103 and 104, bottom wall 105 and a shelf wall 106. Block 65 is secured to trough 100 by means of vertical flange walls 107, 108 and horizontal flange wall 109 which are welded by means of suitable welded seams as indicated at W-1, W-2 and W-3 (FIG. 16). It is desirable to warm the water in trough 100 to approximately 50°C for spreading paraffin ribbons of tissue as later explained and this is performed by suitable electrical strip heaters 120. Warming of the water in trough 100 effects warming of the various parts of base clamp 13. Accordingly, it is desirable to cool the backside of base clamp 13 and blade holder 18 by means of cooling air entering inlet 100 and exiting through ports 101 (FIG. 3) as previously explained. An operationally convenient arrangement for warming single slides is provided by a heated panel 150 which is heated by means of a strip heater 121 to maintain a temperature of about 58°C. Use of the second embodiment will be explained later and the description next proceeds to the structure of the third embodiment illustrated in FIGS. 23 and 24.

Figure 23:
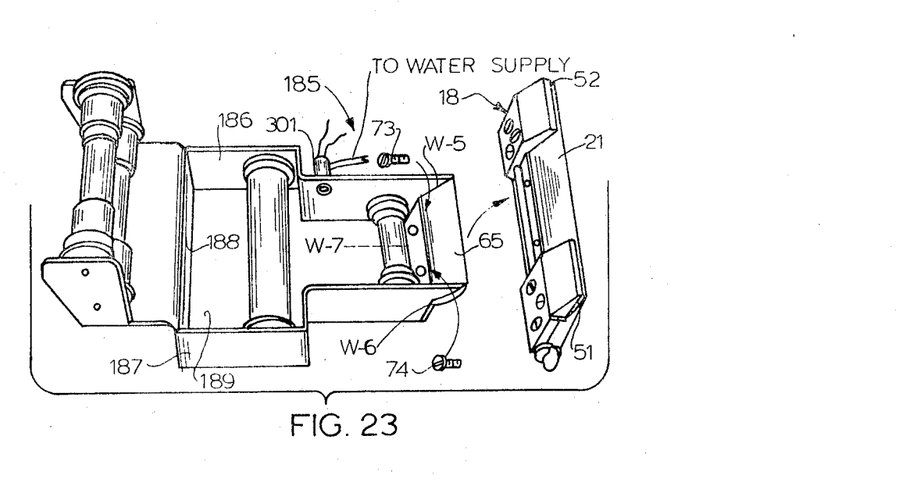
FIG. 23 is an exploded perspective view of a third embodiment base clamp and associated blade holder of the invention.
Figure 24:
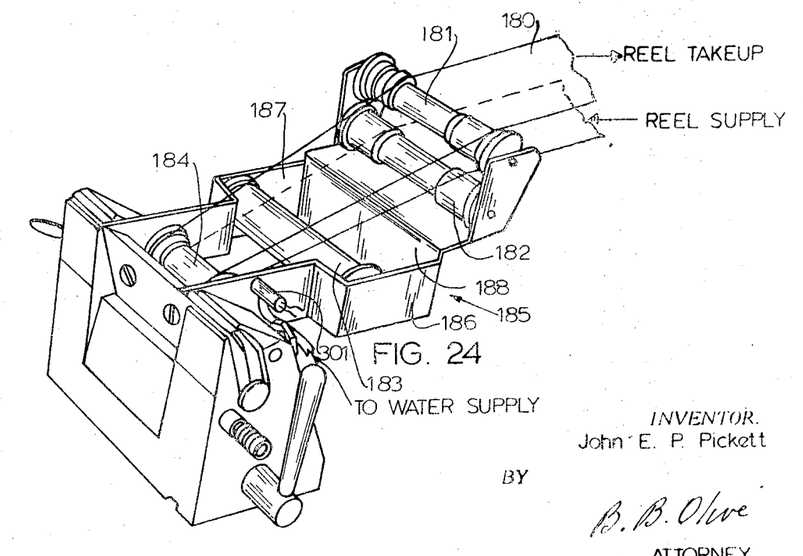
FIG. 24 is a pictoral view of the third embodiment base clamp and associated blade holder clamp of the invention shown in use with a typical film strip.

The third embodiment like the first and second embodiments employs the same basic and previously described base clamp 13 and blade holder 18 therefore the details and advantages of this part of the construction shown in FIGS. 23 and 24 will not be dealt with here. Basically the third embodiment provides a means for guiding a film strip 180 on guide rollers 181, 182, 183 and 184 through a water trough 185 formed by sidewalls 186, 187 and 188 and bottom wall 189 and block 65 to which walls 186 and 187 are welded at seams W-5, W-6 and W-7, not shown. The film guide structure shown in FIGS. 23 and 24 adapts to either wide or narrow width film, e.g. 35 mm or 70 mm, as indicated by the guide flanges shown in FIGS. 23 and 24. For a fuller explanation of the general use of film techniques and the value of being able to directly mount serially cut tissue on film as the film is being cut, reference is made to U.S. Pat. No. 3,552,247 which deals with cutting with a conventional non-disposable knife. However, there is shown essentially the same tissue mounting operations as provided by apparatus of FIGS. 23 and 24 but without the advantages of the base clamp 13 of the present invention. A fuller explanation concerning use of the third embodiment follows in the later description.

Figure 25:
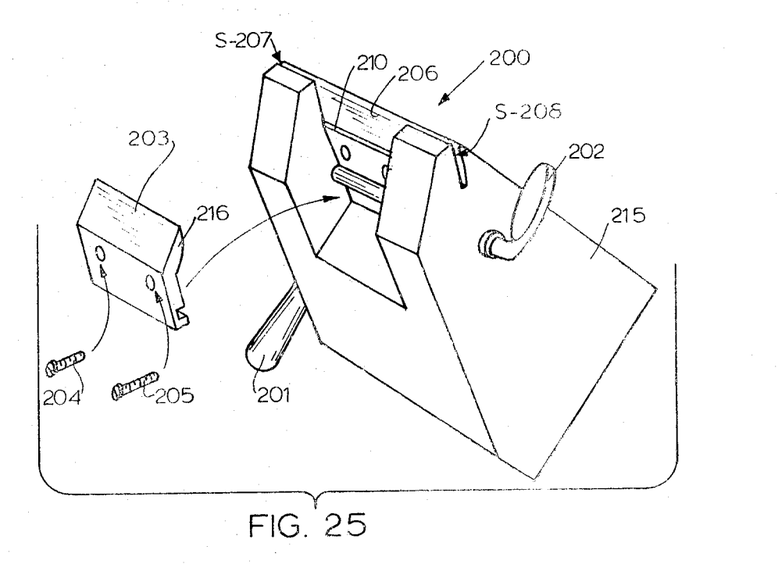
FIG. 25 is an exploded perspective view of a fourth embodiment of the invention which integrates the base clamp and blade holder functions in a single blade clamp structure.
Figure 26:
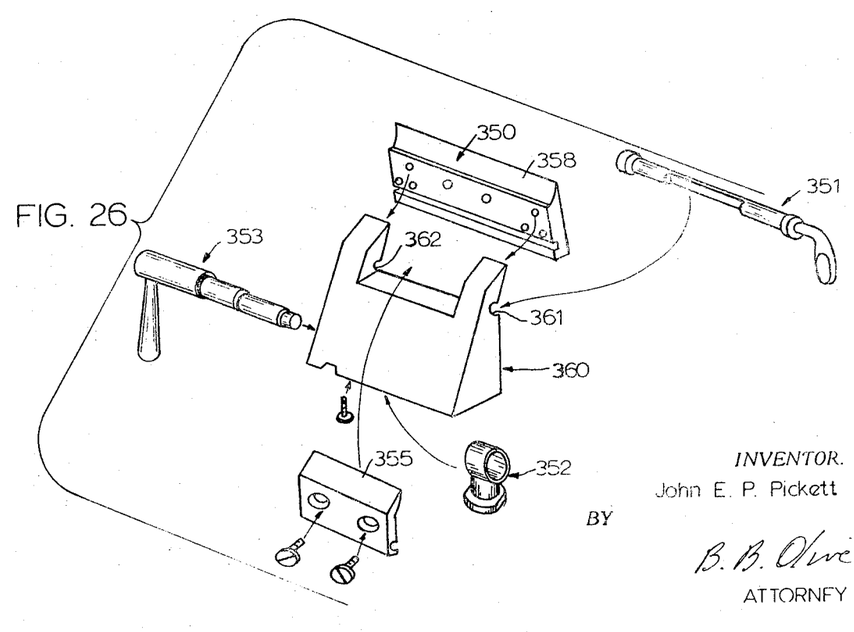
FIG. 26 is an exploded perspective view of a fifth embodiment.
Figure 27:
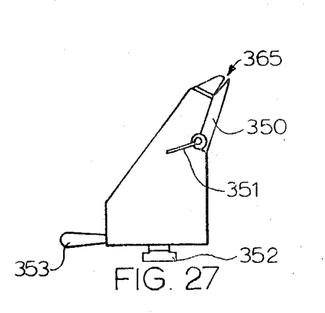
FIGS. 27, 28, 29 and 30 are respectively right end elevation, front elevation, bottom and back elevation views of the fifth embodiment.
Figure 28:
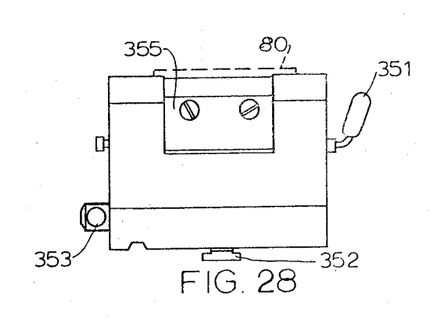
Figure 29:
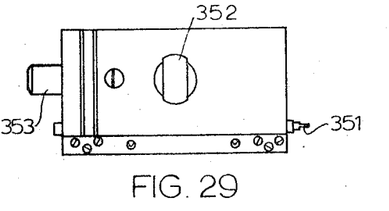
Figure 30:
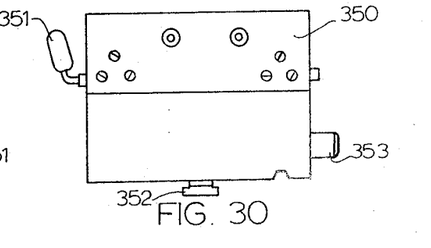

A fourth embodiment base clamp 200 is illustrated in FIG. 25 and represents a form of blade clamp construction which combines the base clamp and blade holder functions and eliminates both tilt and vertical positioning of the blade. In particular, camming lever 201 compares to camming lever 91 (FIG. 1), lever 202 compares to lever 60 (FIG. 10), block 203 to block 65 (FIG. 12), pivotal and adjusting screws 204, 205 compare to screws 73, 74 (FIG. 10), backing surface 206 compares to backing surface 21 (FIG. 9), ledge 210 compares to ledge 22 (FIG. 9), and slots S-207 and S-208 compare to slots S-1 and S-2 (FIG. 23). While not shown it should be understood that a clamping stud comparable to stud 90 is employed on the base block 215 shown in FIG. 25. It should be understood that the curving and releasing of a disposable blade in the base clamp 200 of FIG. 25 is the same as that shown in FIGS. 13 and 14. In effect, base clamp 200 combines in one structure and functions of the previously described base clamp 13 and blade holder 18. That is, the curvature of backing surface 206 is the same as the curvature of the backing surface 21 of blade holder 18. Block 203 is opened and closed the same as block 65 of blade holder 18 and the blade curving surface 66 (FIG. 12) of block 65 has its counterpart in blade curving surface 216 of FIG. 25. Thus, it will be understood that the exact angular placement and curvatures of surfaces 216 and 206 in FIG. 25 are such as to provide the same cutting angle Y previously discussed in connection with FIG. 14. In use base clamp 200 is mounted on the microtome base and adjusted longitudinally. No vertical or tilt positioning is required. With lever 202 moved to open block 203, a disposable blade 80 (not shown in FIG. 25) is inserted endwise and laterally positioned. Lever 202 is then moved so that block 203 moves from an open position (comparable to FIG. 13) to a closed position in which the disposable blade 80 is curved as illustrated by FIG. 14. Note here that the advantage of avoiding conventional tilt and vertical blade positioning is retained and in addition the functions of the base clamp and blade holder are reduced to a minimum number of parts. Chattering of the blade is avoided and block 203 acts to flex and tension blade 80 in the same manner as block 65 of FIG. 12.

With particular reference to the water trough arrangements of FIGS. 15 through 24 it may be noted that various procedures are used in histology to float, then attach paraffin sections to microscopic slides. Some technicians use a few drops of water on a slide then the short ribbon of paraffin sections are floated on the water. The slide after being drained is then heated over a flame or hot plate. Water baths with temperature controls, for floatation of tissue, are used. In electron microscope microtome cutting, troughs have been used to contain the fluid against t-e glass or diamond knife edge to give smooth laying out of the cut ribbons of sections.

With the foregoing background in mind it can be seen that water floatation procedures involve considerable technician time as does the procedure for adjusting the conventional non-disposable microtome blade. The second and third water trough embodiments thus save considerable time in both respects in that both for single slide mounting of tissue specimens as well as for film mounting of tissue specimens the disposable blade when initially installed as well as when being replaced requires no adjustment in tilt or in vertical positioning. Further as the tissues are cut on the second and third embodiment structures, the specimens instead of having to be lifted from the surface 75 of block 65 can be slid into the warmed water and then drifted on a single slide or guided onto film. The savings in time is thus substantial in the large laboratory where hundreds of specimens are cut daily.

In further explanation of the water trough embodiments it may be noted that the water is poured into the particular trough until it just reaches the blade cutting edge and the respective troughs are sufficiently high to allow this depth of water. Very little water is consumed except from evaporation and may be replaced from a supply bottle or by means of using an automatic water level control indicated at 300 (FIGS. 15-22) and at 301 in FIGS. 23-24. Such level controls are well-known and may be photoelectric or of any of the well-known types and may be used to control water inflow and water level as generally indicated.

Figure 2:
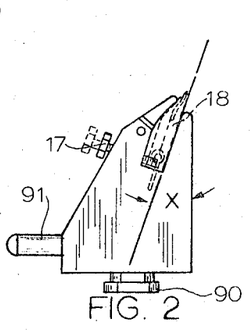
FIG. 2 is a right end elevation of the first embodiment clamp, the holder being shown in dashed lines.
Figure 4:
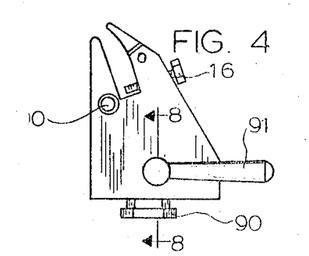
FIG. 4 is a left end elevation view of the first embodiment clamp.
Figure 5:
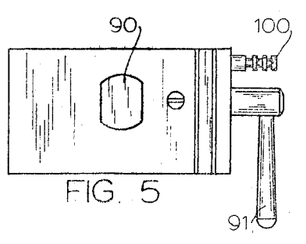
FIG. 5 is a bottom view of the first embodiment clamp.
Figure 6:
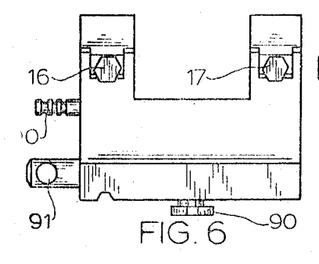
FIG. 6 is a front elevation view of the first embodiment clamp.
Figure 7:
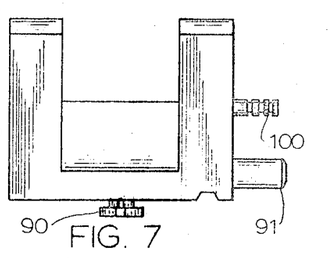
FIG. 7 is a rear elevation view of the first embodiment clamp.
Figure 8:
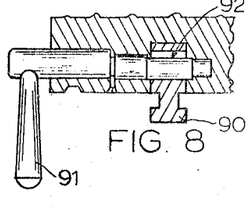
FIG. 8 is a section view taken along line 8—8 of FIG. 4 showing the manner in which the first embodiment clamp is tightened on the microtome base.
Figure 9:
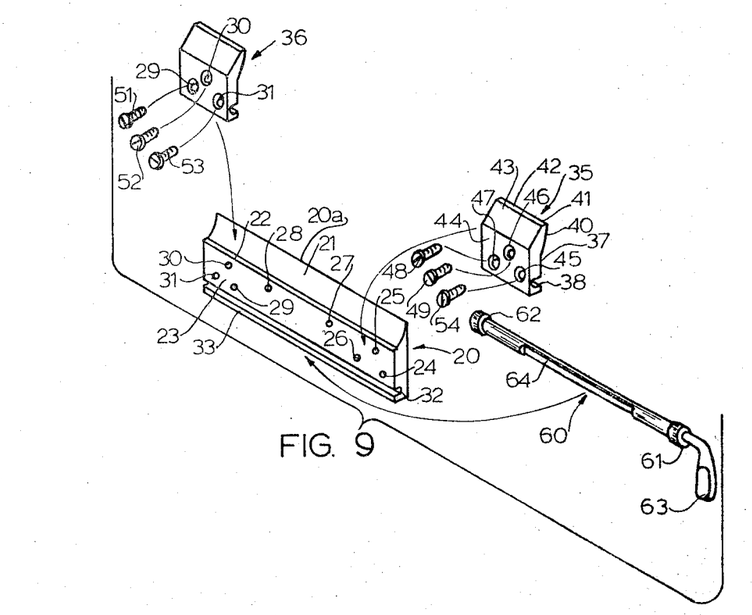
FIG. 9 is an exploded perspective view of the blade holder of the prior copending application and which is employed with the base clamp of this invention.
Figure 12:
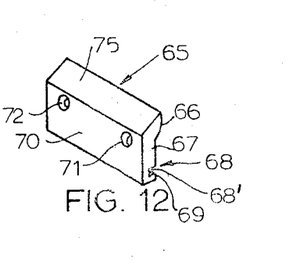
FIG. 12 is a perspective view of the blade bending element used with the blade holder of FIG. 10.

A fifth embodiment is disclosed in FIGS. 26 through 30. The fifth embodiment is basically similar to the fourth embodiment in that the functions of the base clamp and blade holder are combined in a unitary structure. In the fifth embodiment, lever 351 compares to lever 60 (FIG. 10). Backing plate 350 compares to backing plate 20 (FIG. 9). Clamping plate 355 compares to clamping plate 65 (FIG. 12). Lever 353 compares to lever 91 (FIG. 1). Locking stud 352 compares to stud (FIG. 2). With this comparison in mind, it will be noted in FIG. 26 that the base portion 360 is provided with grooves 361, 362 which compare with grooves 38 (FIG. 9).

The mentioned parts of the fifth embodiment are assembled as shown in FIGS. 27 through 30. In use, stud 352 is clamped on the microtome base in the same manner as stud 90 by means of operating lever 353 to cam stud 352. Once the base portion 360 is longitudinally positioned in this manner the curved backing surface 358 will immediately assume a correct position both with respect to tilt as well as vertical level. The disposable blade 80 is inserted endwise through a slot such as indicated at 365 (FIG. 27) until it assumes the position indicated in FIG. 28. Lever 351 is operated the same as lever 60 and is positioned during loading of the disposable blade 80 in a position to force the clamping member 355 outwardly. Once the disposable blade 80 has been properly positioned lever 351 is then appropriately turned to pivot clamping member 355 and press the disposable blade 80 against the backing surface 358 of the backing member 350. From this explanation, it can be seen that the operation of the fifth embodiment is basically the same as that of the prior embodiments. As in the prior embodiments, the fifth embodiment completely eliminates the need for any preliminary vertical or tilt adjustment of the blade. That is, as in other embodiments, once the base portion 360 is appropriately longitudinally positioned, the backing plate 350 is automatically placed in a position such that when the disposable blade is seated and clamped against the backing plate surface 358, the cutting edge of the disposable blade 80 will assume a correct angle of tilt and be disposed at a correct vertical level in the same manner as previously explained in connection with FIGS. 13 and 14.

What I claim is:

1. A method of cutting a specimen on a microtome comprising the steps:
   a. mounting the specimen in a specimen holder mechanism having means for reciprocating and for advancing the specimen relative to a cutting plane;
   b. mounting on the microtome a base clamp and blade holder having a longitudinally movable but laterally fixed base portion and an upper portion fixed to the base portion which upper portion provides a substantially concave blade backing surface with a lower blade support ledge adapted to receive and seat a thin rectangular blade during loading in a non-curved relation and during cutting to provide a surface vertically, laterally, and tiltably fixed against which the blade can be curved, held and seated so that when said base portion is properly longitudinally fixed the cutting edge of said blade is in said cutting plane and located at a precise predetermined vertical level and at a precise predetermined angle of tilt requiring no vertical or tilt adjustment prior to cutting;
   c. mounting on said backing surface a substantially rectangular size disposable blade having a longitudinal cutting edge precision sharpened to microtome knife quality for cutting and the opposed edge free of the conventional guard member and supported on said ledge;
   d. seating and clamping said disposable blade against said backing surface whereby to curve said disposable blade around a longitudinal axis thereof, over substantially its entire plane and in a curvature matching that of said backing surface;
   e. while holding said disposable blade in said clamped position and said base portion clamped in an appropriate longitudinal position, reciprocating and advancing said specimen relative to said cutting plane whereby to cut with said disposable blade and produce sections thereof; and
   f. while retaining said base portion in the same fixed longitudinal position releasing said blade from said surface and replacing said blade with another blade of identical uniform construction and clamping the replacement blade in the same manner as the first blade followed by a repetition of said cutting of said sections.

2. A microtome comprising, in combination:
   a. a specimen holder mechanism including means for holding said specimen, means for applying a reciprocating motion to said specimen for precision cutting of sections in a vertical plane and for advancing the reciprocating specimen holder relative to the cutting plane;
   b. a substantially rectangular uniform size disposable blade having one longitudinal edge precision sharpened to microtome knife quality for cutting and the opposed edge free of the conventional guard member, being of substantially less flexibility than the conventional double edge wafer blade while being adapted to being held clamped and slightly curved around a longitudinal axis when subjected to an appropriate bending force applied over substantially its entire plane;
   c. a base clamp and holder for said disposable blade comprising:
      1. a lower base portion having a fixed lateral position and adapted to being movable longitudinally with respect to the specimen and to being clamped in an appropriate longitudinal position with respect to said cutting plane;
      2. an upper base portion above and operational with said lower base portion, said upper base portion including a first portion integral with said lower base portion and having jaw members and including a second portion comprising a unitary blade holder assembly adapted to be releasably secured in said jaw members, said unitary blade holder assembly:
         a. providing a pair of integral end portions having slots shaped to slidably receive said blade for endwise loading from either respective corresponding end and shaped to allow the ends of said blade to be curved during cutting, and providing between said end portions and proximate said cutting plane a substantially concave blade backing surface with a lower blade support ledge for receiving and seating said blade during loading in a non-curved relation and against which a major portion of one side of said blade may be fixedly held and seated in a curved relation during cutting, said upper and lower base portions being adapted when the ends of said blade are positioned in said slots and said blade is held and seated in said curved relation to place the cutting edge thereof in said cutting plane, at a precise vertical level requiring no adjustment between blade changes and at a precise angle of tilt requiring no adjustment between blade changes;

b. a blade clamping block member having a slight and precise amount of inward-outward movement and mounted centrally of said end portions, said clamping member having a front flat outwardly sloped surface for receiving cut tissue and an opposed rear convex surface mating said concave blade backing surface, said clamping member when at the end of its outward movement providing between its rear convex surface and said concave backing surface a slot adapted to serve as a continuation of said end portion slots to slidably receive said blade and at the end if its inward movement being adapted to contact and clamp substantially all but the cutting edge of the other opposite one side portion of said blade and to hold said blade in a longitudinally tensionless free condition and in said curved relation between said concave and convex surfaces whereby said blade cutting edge obtains said precise vertical level and angle of tilt; and c. a manually operated and rotatable member mounted on said blade holder assembly, said rotatable member being effective when rotated in one direction to move said clamping member in said slight outward movement to a first position so as to effect said slot between said convex-concave surfaces and to release said blade for replacement and in an opposite direction to move said clamping member in said slight inward movement to a second position so as to clamp and curve said blade in said curved relation for cutting.

3. A microtome as claimed in claim 2 including a liquid filled receptacle disposed adjacent to and beneath the edge of said blade and adapted to receive on the surface of the liquid successive said sections cut by said blade, said receptacle being secured to and movable with said clamping member.

* * * * *